(12) United States Patent
Berg

(10) Patent No.: US 9,637,040 B1
(45) Date of Patent: May 2, 2017

(54) TARP DEPLOYING DEVICE WITH FRANGIBLE CONNECTOR FOR REAR DUMP TRAILER

(71) Applicant: Sioux City Tarp, Inc., Sioux City, IA (US)

(72) Inventor: Terry L. Berg, Sioux City, IA (US)

(73) Assignee: Sioux City Tarp, Inc., Sioux City, IA (US)

( * ) Notice: Subject to any disclaimer, the term of this patent is extended or adjusted under 35 U.S.C. 154(b) by 0 days.

(21) Appl. No.: 14/934,139

(22) Filed: Nov. 5, 2015

Related U.S. Application Data

(60) Provisional application No. 62/075,631, filed on Nov. 5, 2014.

(51) Int. Cl.
*B60P 7/04* (2006.01)
*B62J 11/02* (2006.01)
*B60P 1/28* (2006.01)

(52) U.S. Cl.
CPC *B60P 7/04* (2013.01); *B60P 1/28* (2013.01); *B62J 11/02* (2013.01)

(58) Field of Classification Search
CPC ............... B60P 1/28; B60P 7/04; B60J 11/02
USPC .............................................................. 296/98
See application file for complete search history.

(56) References Cited

U.S. PATENT DOCUMENTS

| | | | |
|---|---|---|---|
| 5,002,328 A | 3/1991 | Michel | |
| 5,240,303 A * | 8/1993 | Hageman | B60J 7/062 296/100.12 |
| 6,206,449 B1 | 3/2001 | Searfoss | |
| 8,272,676 B2 | 9/2012 | Bremer | |
| 8,496,283 B1 * | 7/2013 | Schmeichel | B60J 7/085 296/100.16 |
| 8,910,996 B2 | 12/2014 | Bremer | |

\* cited by examiner

*Primary Examiner* — Pinel Romain
(74) *Attorney, Agent, or Firm* — McKee, Voorhees & Sease, PLC

(57) ABSTRACT

A tarp deploying apparatus includes breakaway connector between a radial arm assembly and a tarp roller. The breakaway connector is designed to fracture, or otherwise come apart, to prevent damaging stress from being applied to the tarp roller by the radial arm assembly. Therefore, if a rear flap of a rear-dump trailer on which the radial arm assembly is mounted is dislodged from the tub of the trailer, the breakaway connect will permit separation of the radial arm assembly from the tarp roller without damaging the radial arm assembly or the tarp roller.

12 Claims, 4 Drawing Sheets

TARP DEPLOYING DEVICE WITH FRANGIBLE CONNECTOR FOR REAR DUMP TRAILER

CROSS REFERENCE TO RELATED APPLICATIONS

This application claims priority under 35 U.S.C. §119 to commonly owned U.S. provisional patent application Ser. No. 62/075,631, filed Oct. 5, 2014, the entire contents of which are incorporated by reference herein.

FIELD OF THE INVENTION

This invention relates generally to tarp deploying devices for use on rear dump trailers.

BACKGROUND OF THE INVENTION

Trailers used to haul loose materials such as dirt, sand, gravel, or grain commonly have beds or tubs that have an open top. Therefore, if the trailer bed is not covered as the trailer is pulled over the road, the loose contents may be blown and scattered out of the open top of the trailer bed. Additionally, the contents of the trailer bed may be compromised by rain, or other contaminants. Accordingly, it is known to deploy tarps across the open top space of the trailer beds to cover the contents of the trailer beds.

Several mechanisms have been devised for deploying the tarps across the trailer bed. Many of these devices include radial arms that are rotatably mounted at the front and rear of the tub and have a roll of tarp disposed between them. As the radial arms rotate in one direction across the truck bed, the roll of tarp between the arms is unrolled to cover the contents of the truck bed. When the arms are rotated back in the opposite direction, the tarp is taken back up upon the roll to uncover the trailer bed. Examples of such devices may be seen in Searfoss, U.S. Pat. No. 6,206,449 and in Michel, U.S. Pat. No. 5,002,328.

Rear dump trailers are able to dump their contents by raising the forward end of the tub and releasing a rear door or flap to permit the contents of the tub to slide out under the bottom of the door or flap. Typically the radial arm of the tarp deploying apparatus will be mounted to the rear door or flap. Bremer, U.S. Pat. No. 8,910,996, the entire contents of which are hereby incorporated by reference, shows and describes such a structure.

The rear flap can be subjected to significant stresses during dumping operations as the contents of the of the trailer slide down the trailer and bang into the flap. As a result, the rear flap will occasionally be dislodged from the trailer. In instances where there is no tarp deploying apparatus attached to the rear flap this is an inconvenience, but is easily fixed by simply reattaching the flap. However, for the systems that have the radial arms attached to the rear flap the dislodging of the flap often results in damage to the tarp deploying apparatus. The damage can take the form of bent radial arms, deformed tarp rollers, and ripped tarps. The damage to the tarp deploying system is expensive to repair. Even worse, it can result in lengthy down time for the trailer while replacement parts are being acquired and repairs are being made.

Accordingly, there is a need for an improved tarp deploying apparatus for rear dump trailers that reduces the risk of significant and expensive damage to the tarp deploying apparatus when the rear door or flap becomes dislodged from the trailer.

BRIEF SUMMARY OF THE INVENTION

According to one embodiment the present invention is directed to a tarp deploying apparatus that includes a breakable connection between a tarp roller and the radial arms. According to another embodiment, the present invention is directed to a tarp deploying apparatus wherein a mounting bracket is attached to a rear flap of a tub of a rear-dump trailer. A radial arm is pivotally mounted to the mounting bracket. A breakaway connector is provided at a free end of the radial arm. A universal joint is connected to the breakaway connector. A tarp roller operably attached to the universal joint. The breakaway connector is adapted to fracture upon the rear flap becoming dislodged from the rear-dump trailer. The breakaway connector may have a hollow cylindrical body having a first end connected to the universal joint and a second end attached to the radial arm. The hollow cylindrical body may include a notch to create a frangible portion of the breakaway connector. The breakaway connector may be made from a material that is inherently less durable than the radial arm and the universal joint. The universal joint and the radial arm may made of metal and the breakaway connector may be made of nylon.

According to another embodiment, the present invention is directed to a breakaway connector for use in a tarp deploying apparatus of the type having a radial arm assembly pivotally associated with a rear flap on a rear-dump trailer and a tarp roller assembly. The breakaway connector has a body having a first end adapted for connection to the radial arm assembly and a second end adapted for connection to a universal joint adapted to be connected the tarp roller assembly. The body includes a frangible portion. The body may be a hollow cylindrical body. The hollow cylindrical body may include a notch to create the frangible portion of the breakaway connector.

According to yet another embodiment, the present invention is directed to a rear dump trailer that has a trailer frame with a tube supported on the trailer frame and a mechanism for selectively elevation a forward portion of the tub relative to a rear portion of the tub to thereby dump contents of the tub rearwardly. A rear flap is hingedly attached to the rear portion of the tub. A radial arm assembly is rotatably mounted to the rear flap. A tarp roller positioned to selectively cover and uncover the tub with a tarp on the tarp roller. A breakaway connector is provided between the radial arm assembly and the tarp roller, such that the breakaway connector will fracture to prevent damage to the radial arm assembly and tarp roller if the rear flap becomes separated from the tub. The breakaway connector may be made of nylon. The breakaway connector may have a hollow cylindrical body having a first end connected to a universal joint attached to the tarp roller and a second end attached to a distal end of the radial arm assembly. The hollow cylindrical body may have a notch to create a frangible portion of the breakaway connector.

BRIEF DESCRIPTION OF THE DRAWINGS

FIG. 4b is a side detail view of the connection of FIG. 4a.

DETAILED DESCRIPTION OF THE PREFERRED EMBODIMENT

Figure 1:
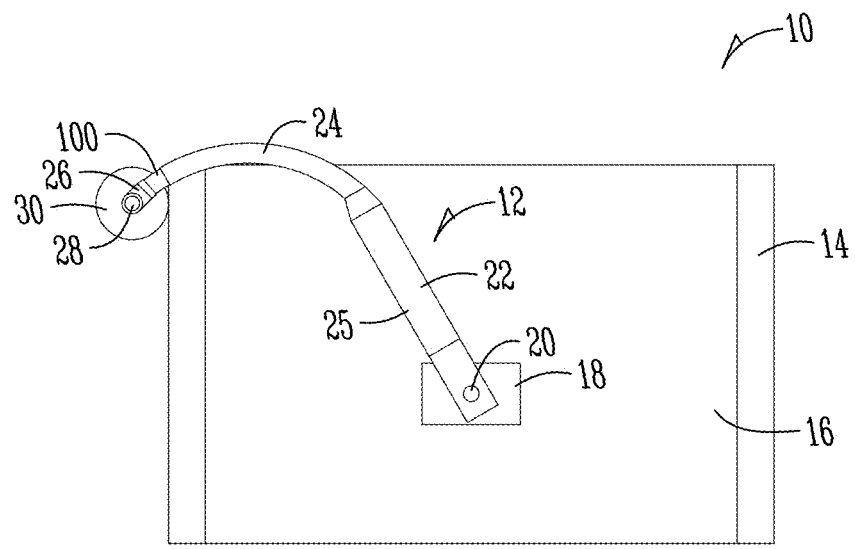
FIG. 1 is rear view of a truck with a tarp deploying device according to the present invention attached in a rolled-up position.
Figure 2:
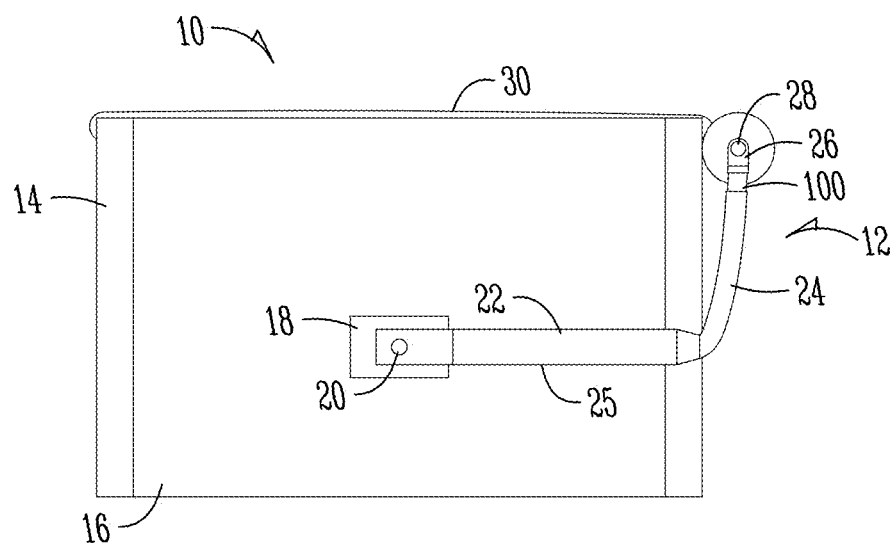
FIG. 2 is a rear view of the truck and tarp deploying apparatus of FIG. 1 with the tarp deploying apparatus in a fully deployed position.

FIGS. 1 and 2 show a rear dump trailer 10 with a tarp deploying apparatus 12 according to one embodiment of the present invention. The trailer includes a tub 14 with a rear flap or door 16. The flap or door 16 is pivotally mounted near its top to the tub 14 such that it can rotate open when the tub 14 is tilted (see FIG. 3). In FIG. 1 the tarp deploying apparatus 12 is in an open configuration with the top of the tub 14 uncovered. FIG. 2, the tarp deploying apparatus 12 is in a closed or fully deployed configuration, with the tarp 30 covering the tub 14.

The tarp deploying apparatus 12 includes a mounting bracket 18 fixed to the flap or door 16. The mounting bracket 18 includes a pin 20. A radial arm assembly 25 includes proximal radial arm 22 is pivotally mounted to pin 20. The proximal radial arm 22 should be made of a durable rigid material, such as steel or aluminum. At the free end of the proximal radial arm 22 a distal radial arm 24 is mounted. According to a preferred embodiment, the distal radial arm 24 is flexible, and may be formed from a double-walled hydraulic hose. Alternatively, the distal radial arm 24 may be formed from a helical spring or a helical spring provided within a flexible cover. As a further alternative, the distal radial arm may be rigid, similar to the proximal radial arm 22. At the free end of the radial arm assembly 25 a universal joint 26 is attached to a breakaway connector 100. The universal joint is connected to a tarp roller 28. FIG. 1 shows the tarp deploying apparatus 12 in an open configuration.

Figure 3:
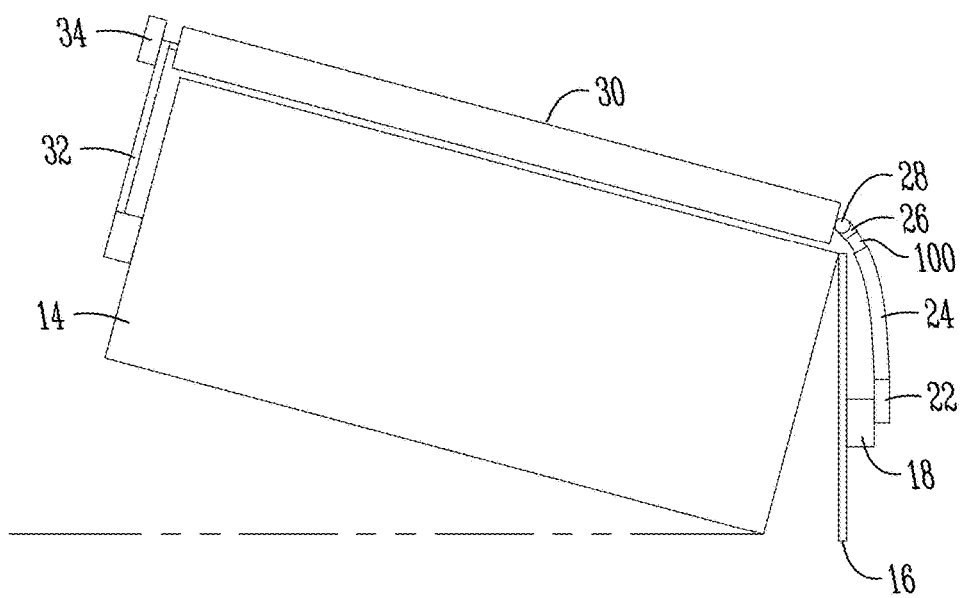
FIG. 3 is a side elevation view of the truck and tarp deploying apparatus of FIG. 1, with a front portion of the tub raised to a dumping position.

As can be seen in FIG. 3, a front radial arm assembly 32 may be provided to help suspend and move the tarp 30. The front radial arm assembly 32 preferably includes an electric motor 34 to deploy the tarp and to roll the tarp 30 back up to the open configuration of FIG. 1. Examples of suitable radial arm assemblies and motors may be found in U.S. Pat. No. 8,272,676, the entire contents of which are incorporated by reference.

The radial arm assembly 25 is biased towards the closed deployed configuration of FIG. 2 by a set of coil springs (not shown) that are provided between the mounting bracket 18 and the proximal arm 22. In FIG. 2, the tarp 30 is fully deployed covering the open top of the tub 14. In practice bows (not shown) or similar structures may be provided to support the deployed tarp 30 above the top of the tub 14. The motor may be used to roll the tarp 30 part way back on to the tarp roll 20 to maintain the tarp 30 in in a tight secure final closed position. To move the tarp 30 back towards the open configuration, the motor (not shown) may be operated in the reverse direction to wind the tarp 30 back up onto the tarp roll, causing the radial arms 22 and 24 to rotate back towards the open position (counter clockwise in FIGS. 2 and 3). The springs (not shown) that urge the proximal arm 22 towards the closed deployed position hold the tarp 30 tight as it is rolled back up on to the tarp roller 28.

FIG. 3 shows the tub 14 in a tilted position to dump any contents of the tub 14 rearwardly as the rear flap 16 is permitted to swing outwardly from the tub 14 under the force of gravity. A releasable latch of some type (not shown) will generally be provided that must be released to permit dumping. It should be appreciated that the tub 14 will be mounted on a trailer provided with a hydraulic lift, as is well known of rear-dump trailers. The universal joint 26 provides a connection between the distal arm 24 and the tarp roller 22 that is flexible and can vary angularly to permit the swinging open of the rear flap 16 without disconnecting the radial arm assembly from the tarp roller 28. This flexibility is enhanced when the distal arm 24 is flexible, such as a double-walled hydraulic hose construction as preferred. The breakaway connector 100 is used to connect the distal arm 24 of the radial arm assembly 25 to the universal joint 26

Figure 4A:
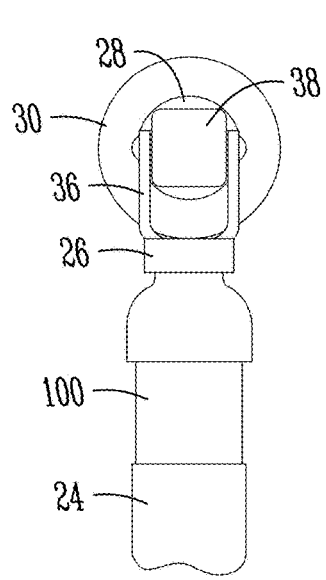
FIG. 4a is a rear detail view of the connection between the radial arm and the tarp roll, according to one embodiment of the present invention.
Figure 4B:
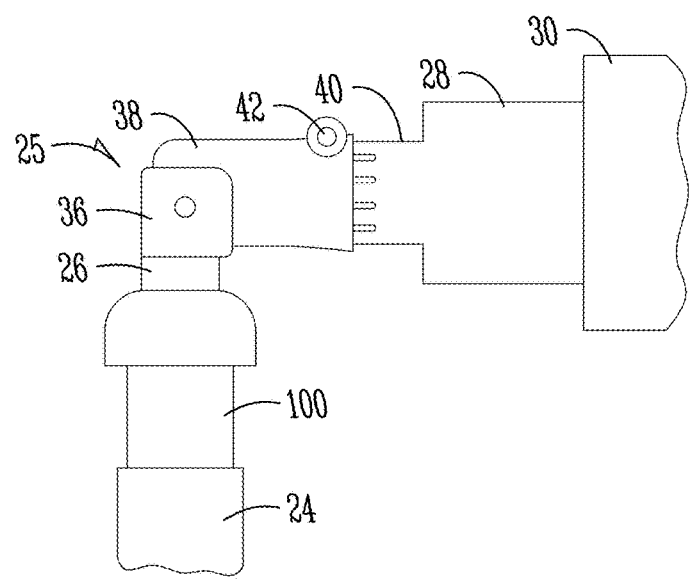

FIGS. 4a and 4b show the connection between the distal arm 24 and the tarp roller 28 that is accomplished through universal joint 26 and the breakaway connector 100. The universal joint 26 includes a base 36 pivotally attached to socket portion 38. The socket portion 38 receives a splined end 40 of tarp roller 28. The inner surface (not shown) of the socket portion 38 is of slightly greater inner diameter than the outer diameter of the splined end 40 of the tarp roller 28, such that the splined end 40 will freely rotate within the socket 38. Preferably the inner surface (not shown) of the socket 38 will be smooth so as not to grab or catch against the splines of the splined end 40 as the tarp roller 28 rotates. A catch pin 42, which can be selectively removed, is provided in engagement with the socket portion 38 of the universal joint 26. As best seen in FIG. 5b, the splined end 40 includes a circumferential groove 42 that aligns with and is engaged by the catch pin 42 to retain the splined end 40 within the socket portion 38. As an alternative to the removable catch pin 42, a sliding collar (not shown) with catch bearings similar to those used on power takeoffs might be substituted on the socket portion 38 to releasably attach socket portion 38 and the splined end 40.

On rare occasions the electric motor 34 may be inoperable, either because of failure of the motor or lack of a power source. In that case it becomes necessary to deploy the tarp 30 without the use of the motor 34. According to the present invention this can be easily accomplished by disconnecting the socket portion 38 of the universal joint 26 from the splined end 40 of the tarp roller 28. The catch pin 42 is withdrawn from the socket potion 38, for example by unscrewing it if it is a threaded fastener, and the socket portion 38 is then pulled off of the splined end 40. The flexible distal arm 24 permits disconnection without the need to remove the arms 22, 24 from the mounting bracket 18. The splined end 40 of the tarp roller 28 also permits a hand crank to be used to rotate the tarp roller 28 in the case where the socket portion 38 is disconnected from the tarp roller 28.

The breakaway connector 100, along with the universal joint 26, provides a connection between the radial arm assembly 25 and the tarp roller 28. The breakaway connector 100 may take several forms. The breakaway connector 100 is designed to fracture, such that the radial arm assembly 25 will separate from the tarp roller 28 before the radial arm assembly 25 can put sufficient stress on the tarp roller 28 that there is a risk of permanent damage to the tarp roller 28. The most common occurrence that could result in such damaging stress being applied to the tarp roller 28 by the radial arm assembly 25 is when the rear flap 16 becomes accidentally dislodged from the tub 14 and pulls the radial arm assembly 25 violently downward. The breakaway connector 100 should be durable enough that it will not break during standard use of the tarp deploying apparatus 12, but should permit separation of the radial arm assembly 25 from the tarp roller 28 before any permanent damage occurs to the arms 22 and 24 or the tarp roller 28.

Figure 5:
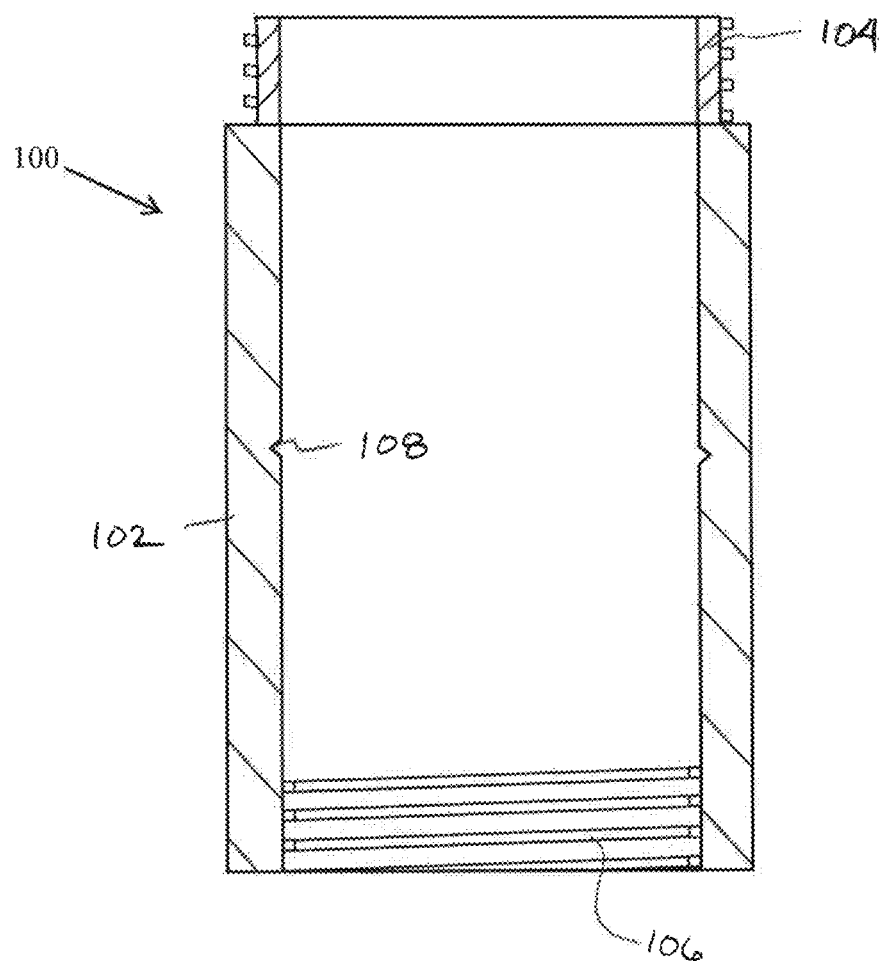
FIG. 5 is a cross-section view of one embodiment of a breakable connector according to the present invention.

A cross-sectional view of one embodiment of the breakaway connector 100 is shown in FIG. 5. According to the embodiment of FIG. 5, the breakaway connector has a hollow cylindrical body 102. A male threaded portion 104 extends from a first end of the body 102, and a female threaded portion 106 is provided at the opposite end of the cylindrical body 102. The male threaded portion 104 may be used to connect the first end of the body 102 to the universal joint 26. The female threaded portion 106 is adapted to receive a corresponding male threaded portion at the end of the distal arm 24 or the radial arm assembly 25. Optionally, a weak portion may be provided on the connector 100. For example a notch 108 may be provided on the body 102 to provide a breaking line for the connector 100. The breakaway connector 100 may be made from a material that is inherently less durable than the metal components used for radial arm connectors and the universal joint 26. For example, the breakaway connector 100 may be a nylon or plastic part. Alternatively, the breakaway connector 100 may be made from a durable material, such a metal, but be sized and shaped to be frangible, such that it will fracture before the other parts of the system are unduly stressed. Those of ordinary skill in the art will be aware of numerous shapes and materials for the breakaway connector 100 that will serve the purpose of breaking apart under sufficient stress.

Figure 6:
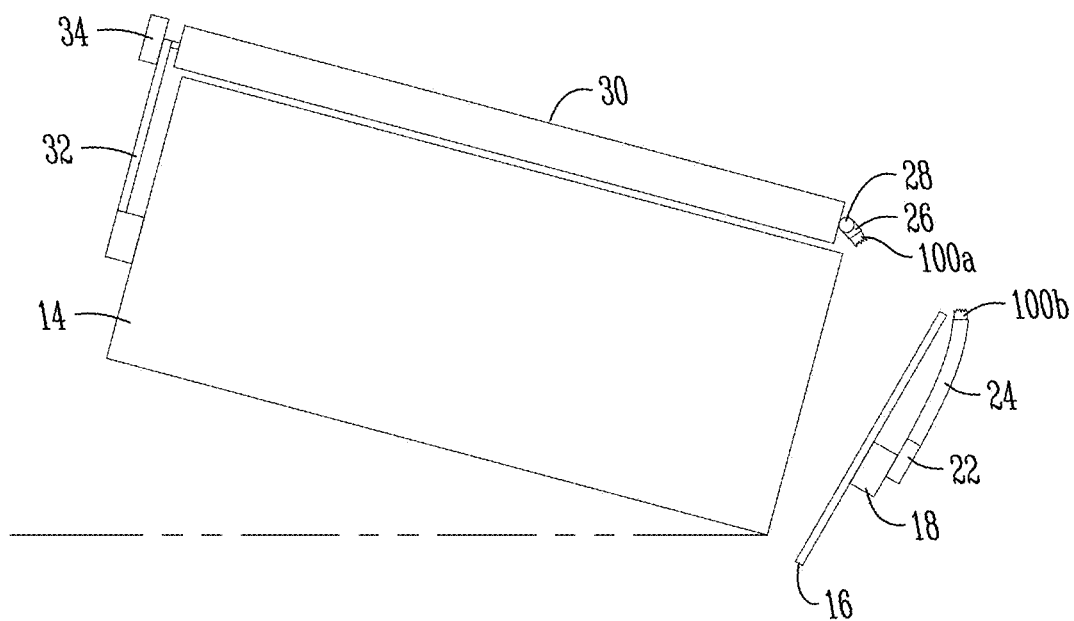
FIG. 6 is a side elevation view of the truck and tarp deploying apparatus of FIG. 3, wherein the rear flap had become dislodged from the trailer, and the breakable connector has fractured allowing the radial arm to separate from the tarp roller without damage to the tarp roller.

FIG. 6 shows the tarp deploying apparatus 12 in the situation where the rear flap 6 has been dislodged from the tub 14. The breakaway connector 100 has fractured and split into a first portion 100a attached to the tarp roller assembly at the universal joint 26 and a second portion 100b attached to the radial arm assembly 25. The radial arm assembly 25 and the tarp roller 28 are unharmed. To reattach the radial arm assembly 25 to the tarp roller 28, all that is needed is to extract the fractured portions 100a and 100b of the breakaway connector 100 from the radial arm assembly 25 and the universal joint 26, and to use a new breakaway connector 100 to connect the arm assembly 25 with the universal joint 26. The breakaway connector 100 is a relatively inexpensive part. Spare connectors 100 can be easily stored on the trailer 10 or other convenient location. As a result, the separation of the flap 16 from the tub 14 no longer results in significant damage to the roller 28 or other components that can be expensive and time consuming to repair.

What is claimed is:

1. A tarp deploying apparatus comprising:
   a mounting bracket attached to a rear flap of a tub of a rear-dump trailer;
   a radial arm pivotally mounted to the mounting bracket;
   a breakaway connector at a free end of the radial arm;
   a universal joint connected to the breakaway connector;
   a tarp roller operably attached to the universal joint; and
   wherein the breakaway connector is adapted to fracture upon the rear flap becoming dislodged from the rear-dump trailer.

2. The tarp deploying device of claim 1, wherein the breakaway connector has a hollow cylindrical body having a first end connected to the universal joint and a second end attached to the radial arm.

3. The tarp deploying device of claim 2, wherein the hollow cylindrical body includes a notch to create a frangible portion of the breakaway connector.

4. The tarp deploying device of claim 1, wherein the breakaway connector is made from a material that is inherently less durable than the radial arm and the universal joint.

5. The tarp deploying device of claim 4, wherein the universal joint and the radial arm are made of metal and the breakaway connector is made of nylon.

6. A breakaway connector for use in a tarp deploying apparatus of the type having a radial arm assembly pivotally associated with a rear flap on a rear-dump trailer and a tarp roller assembly, the breakaway connector comprising:
   a body having a first end adapted for connection to the radial arm assembly and
   a second end adapted for connection to a universal joint adapted to be connected the tarp roller assembly; and
   wherein the body includes a frangible portion.

7. The tarp deploying device of claim 6, wherein the body is a hollow cylindrical body.

8. The tarp deploying device of claim 7, wherein the hollow cylindrical body includes a notch to create the frangible portion of the breakaway connector.

9. A rear-dump trailer comprising:
   a trailer frame;
   a tub supported on the trailer frame;
   a mechanism for selectively elevating a forward portion of the tub relative to a rear portion of the tub to thereby dump any contents of the tub rearwardly;
   a rear flap hingedly attached to the rear portion of the tub;
   a radial arm assembly rotatably mounted to the rear flap;
   a tarp roller positioned to selectively cover and uncover the tub with a tarp on the tarp roller;
   a breakaway connector between the radial arm assembly and the tarp roller, such that the breakaway connector will fracture to prevent damage to the radial arm assembly and tarp roller if the rear flap becomes separated from the tub.

10. The rear-dump trailer of claim 9, wherein the breakaway connector is made of nylon.

11. The rear-dump trailer of claim 9, wherein the breakaway connector has a hollow cylindrical body having a first end connected to a universal joint attached to the tarp roller and a second end attached to a distal end of the radial arm assembly.

12. The rear-dump trailer of claim 11, wherein the hollow cylindrical body includes a notch to create a frangible portion of the breakaway connector.

* * * * *